INVENTOR
JOSEPH C. SEIGH
BY G. R. Gugger
AGENT

United States Patent Office 3,224,130

Patented Dec. 21, 1965

3,224,130

RECORD CARDS

Joseph C. Seigh, Endicott, N.Y., assignor to International Business Machines Corporation, New York, N.Y., a corporation of New York Filed Dec. 26, 1961, Ser. No. 161,917
3 Claims. (Cl. 40—158)

This invention relates to record cards and more particularly to film record cards which have mounted therein transparencies, microfilm, motion picture film, and the like.

Film record or photo aperture cards which have, for example, microfilm mounted therein and which cards may also be perforated for use with electrical card-handling machines, such as sorters, are well known and have been in general use in the formation of film libraries and the like wherein the film records may be projected for purposes of information retrieval. In such cases it is important that all of the edges of the films or transparencies should be firmly bound and secured to the record card so that they do not project from either face of the card. As such cards are frequently stacked by the thousands, it is also important that the means for securing the films or transparencies within the apertures in the record cards shall not add to the over-all thickness of the card at the place where the film or transparency is mounted.

Many different methods of making and assembling film record cards meeting the above requirements have been employed and heretofore the most widely acceptable method of producing such record cards has been to make a record card having an aperture therein, with the marginal portions of the card surrounding the aperture rabbeted or otherwise shouldered to receive the film or transparency. The film is then secured or bonded onto the marginal shoulder surrounding the aperture by using a suitable adhesive material or the thermoplastic film may be bonded directly to the shouldered portion by using heat and pressure. In either case, the method of assembly of the film to the card requires special equipment for applying the adhesive or to carry out a hot die pressing operation. And it has been found that a great many users of the film record system desire to purchase record cards which have been provided with only the shouldered aperture so that they will be able to mount the films themselves, in which case, it was necessary for the purchaser to provide the special equipment needed to mount the film. It became evident then, that a much simpler method of assembling a film record card was needed and one which would not require special equipment. Hence, an important feature of the present invention is the production of a film record card in which the film or transparency may simply be manually inserted into the aperture in the card with the card portions surrounding the aperture being adapted to retain the inserted film without the use of adhesives or heat and pressure bonding.

More specifically, one embodiment of the present invention contemplates an aperture card of three-ply laminated construction and each ply is provided with a circular hole. The plies are glued together with their holes in alignment to form the record. The holes in the top and bottom plies are of the same size and are smaller than the hole cut in the center ply and, in addition, a small slot is cut in the top ply which intersects the periphery of the hole cut therein. This construction results in a laminated record card which includes a screw hole into which a circular transparency may be easily screwed either during the manufacture of the card or by the customer at some later time.

Other embodiments of the present invention contemplate an aperture card which is also of three-ply laminated construction. The plies are provided with rectangular holes of varying dimensions such that portions of the card stock which surrounds the holes in the two outer plies overlap the apertured portion in the center ply and also overlap each other at the corners to provide a pocket into which a rectangular transparency may be easily inserted.

Accordingly, a principal object of the present invention is to provide an improved film record card and method of assembly of a film into said record card.

A further object of the present invention is to provide an improved photo aperture card wherein the transparency or film may be simply inserted into a secure position in the aperture.

A still further object of the present invention is to provide an improved photo aperture card in which a transparency or film is retained between the planes of the opposite faces of the card without the use of an adhesive or the application of heat and pressure.

The foregoing and other objects, features and advantages of the invention will be apparent from the following more particular description of preferred embodiments of the invention, as illustrated in the accompanying drawings.

Figure 1:
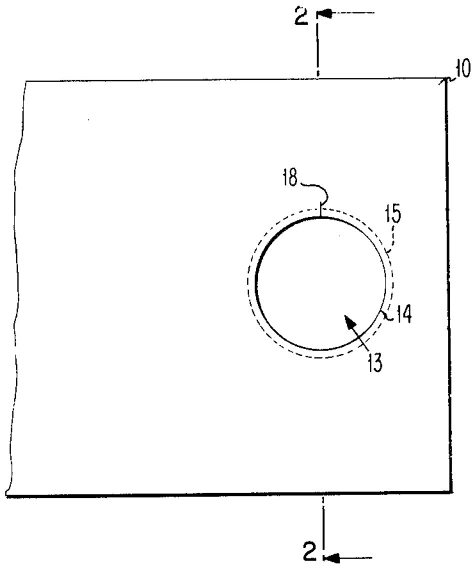
FIG. 1 is a plan view of one end of a record card of the present invention showing one embodiment of the aperture therein.
Figure 2:
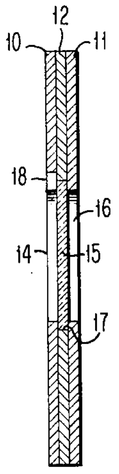
FIG. 2 is a sectional view taken on line 2—2 of FIG. 1 showing the aperture construction.

Referring in particular to FIGS. 1 and 2, a card constructed in accordance with one embodiment of the present invention is shown comprising a pair of outer paper sheets 10 and 11 and an intermediate paper sheet 12. The intermediate paper sheet is secured to the inner faces of the two outer sheets by means of a suitable adhesive. The card is of the usual rectangular shape and the combined thickness of the three thin plies of flexible material, such as calendered paper, is preferably around .007 inch, which is the thickness of the cards commonly used in electrical card handling machines.

The card is provided with an aperture 13. Although the aperture may be positioned anywhere on the card, it generally is positioned near one end to leave a substantial portion of the record free to receive printed and perforated data. The aperture 13 is formed by the three superposed circular holes 14, 15 and 16 cut in the paper plies. As shown, the holes have their centers in alignment and the holes 14 and 16 cut in the outer two sheets are equal in diameter whereas the hole 15 in the intermediate sheet has a larger diameter than that of holes 14 and 16. By virtue of this construction, the card is provided with an internal groove or race 17 which is adapted to retain an inserted film or transparency piece. To facilitate the insertion of a film piece, there is cut in the outer sheet 10 a straight slot 18 which intersects with the hole 14 and extends radially outward to the periphery of the center hole 15.

Figure 3:
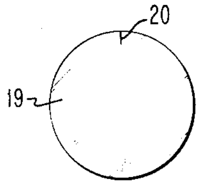
FIG. 3 is a plan view of a circular film insert which is to be used with the card of FIG. 1.

In FIG. 3 there is shown a circular transparency or film piece 19 which is adapted to be mounted in the aperture of the card shown in FIGS. 1 and 2. The film piece 19 preferably has a diameter which is just slightly less than the diameter of the center hole 15 and has a thickness which is equal to the thickness of the intermediate sheet. It is provided with a straight cut or slot 20 to facilitate insertion of the film into the aperture.

Figure 4:
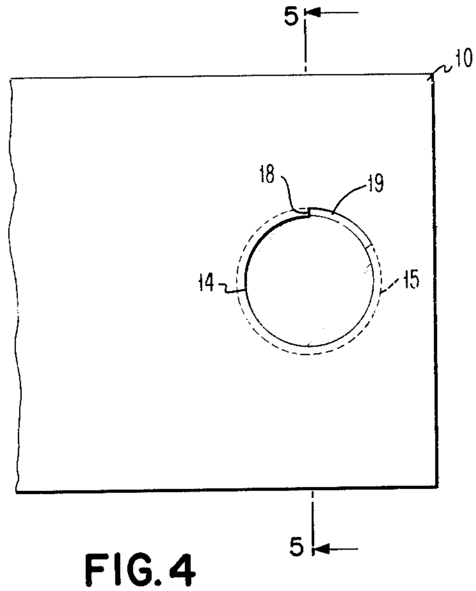
FIG. 4 is a plan view of the card shown in FIG. 1 with the film insert of FIG. 3 partially inserted into the aperture.
Figure 5:
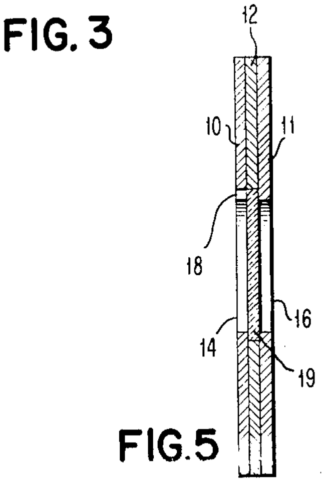
FIG. 5 is a sectional view taken on line 5—5 of FIG. 4.

FIGS. 4 and 5 show the card of FIG. 1 with the film piece 19 partially inserted into the aperture. To insert the film, the film piece 19 is placed over the aperture with the slots 20 and 18 in alignment. Then, by moving one of the film flaps formed by the slot 20 underneath one of the card flaps formed by the slot 18 and simply rotating the film piece 19, the film may be easily screwed into the groove or race 17. When fully screwed in, the entire periphery of the film piece will be seated within the internal groove 17 and it is retained therein without the use of any adhesive or heat and pressure and with no danger of the film falling out or becoming separated from the card through the normal usage to which a photo aperture card is subjected. And as is generally required in photo aperture cards, the film insert lies wholly between the planes of the opposite faces of the card. If desired, the film piece may be easily removed from the card by simply unscrewing it from the groove 17.

Figure 6:
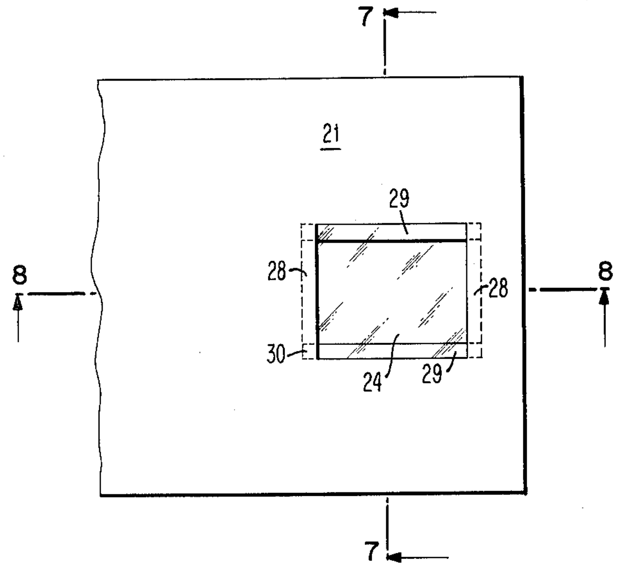
FIG. 6 is a plan view of one end of a record card of the present invention showing a second embodiment of the aperture therein.
Figure 7:
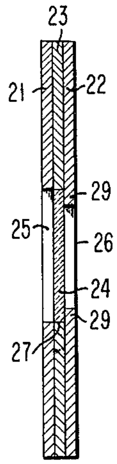
FIG. 7 is a sectional view taken on line 7—7 of FIG. 6.
Figure 8:
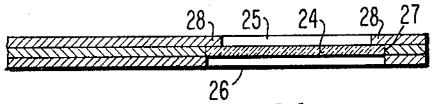
FIG. 8 is a sectional view taken on line 8—8 of FIG. 6.

FIGS. 6, 7 and 8 show another embodiment of a photo aperture card wherein a three-ply laminated card having the two outer sheets 21, 22 and an intermediate sheet 23 is provided with a rectangular aperture into which a rectangular film piece 24 may be easily inserted and retained wholly between the planes of the opposite faces of the card without the use of an adhesive and heat or pressure. The aperture is formed by the three rectangular cuts 25, 26 and 27 made in the sheets 21, 22 and 23, respectively. As shown, the rectangular cut 27 in the intermediate sheet is larger than the cuts made in the outer two sheets. The rectangular cut 25 in the top sheet is made shorter in a direction running lengthwise of the card so that a portion 28 of the top sheet adjacent each of the short sides of the cut 25 will extend over the corresponding edges of the intermediate cut 27. Also, the rectangular cut 26 in the bottom sheet is made shorter in a direction running from the top to the bottom of the card so that a portion 29 of the bottom sheet adjacent each of the longer sides of the cut 26 will extend over the corresponding edges of the intermediate cut 27. The portions 28 and 29 of the top and bottom sheets overlap each other at the corners 30 of the aperture. The rectangular film piece 24 is mounted in the aperture by simply inserting the edges of the film in between the card portions 28 and 29 which border the aperture and which serve to amply retain the film within the card.

Figure 9:
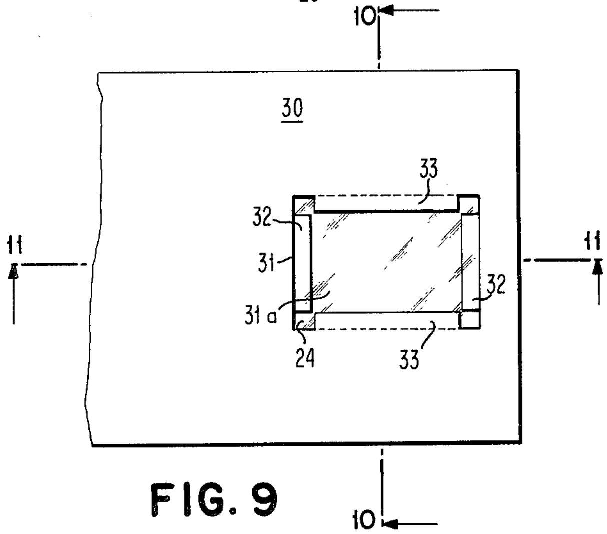
FIG. 9 is a plan view of one end of a record card of the present invention showing another embodiment of the aperture therein.
Figure 10:
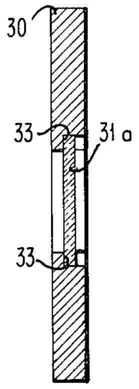
FIG. 10 is a sectional view taken on line 10—10 of FIG. 9.
Figure 11:
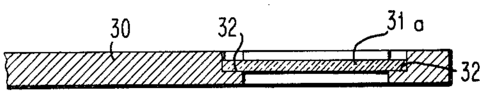
FIG. 11 is a sectional view taken on line 11—11 of FIG. 9.

FIGS. 9, 10 and 11 show a single ply card 30 in which suitable shoulders are ground or rabbeted to provide a recantgular apertured pocket 31 into which a rectangular piece of film 31*a* may be easily inserted. To form the pocket 31, a pair of parallel shoulders 32 are first ground to a certain depth in the top face of the card and then another pair of parallel shoulders 33, disposed at right angles to the shoulders 31, are ground to a certain depth in the bottom face of the card. The ground portions meet at the corners 34 to provide four rectangular holes which extend completely through the card. The apertured pocket is completed by cutting out the center rectangular section of card stock extending between the shoulders 32 and 33. The inserted piece of film 31*a* is retained within the card between the shoulders 33 at the top and the shoulders 32 at the bottom.

Figure 12:
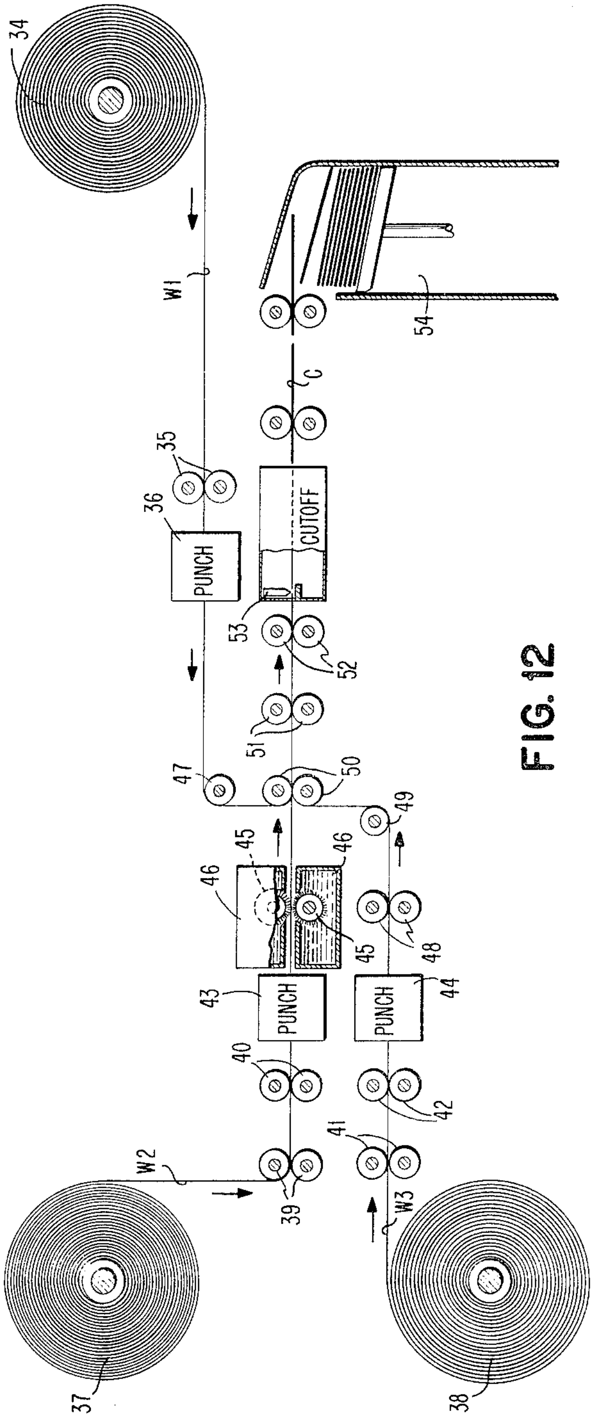
FIG. 12 illustrates diagrammatically a method of manufacturing a card according to FIGS. 1 and 6.

FIG. 12 schematically illustrates one form of apparatus for manufacturing the laminated cards 10 and 21, shown in FIGS. 1 and 6, respectively. Referring to FIG. 12, a web W1 of paper card stock for forming the top outer sheet of the card is led from a supply reel 34 through a pair of feed rolls 35 to a suitable flying punch unit 36 which forms the apertures in the traveling web W1 at regularly spaced intervals therein. In the present instance, it is assumed that one aperture, such as 14 in FIG. 1 or 25 in FIG. 6, is formed in each card-length section of the web W1. Simultaneously, a web W2 of paper card stock for forming the intermediate sheet of the card and a web W3 of paper card stock for forming the bottom outer sheet of the card are led from their respective supply reels 37 and 38 through respective pairs of feed rolls 39, 40 and 41, 42 to the respective flying punch units 43 and 44. The punch units 43 and 44 form the required apertures in the traveling webs W2 and W3 in each card length section of the webs.

After the apertures are cut, the intermediate web W2 passes between a pair of adhesive applicator rolls 45 the cylindrical surfaces of which are supplied with adhesive from containers 46 associated therewith. As adhesive is being applied to both sides of the intermediate web, the webs W1 and W3 are being fed by their respective feed rolls 47 and 48, 49 to the entrance of a pair of pressure rolls 50, at which point they are joined with the intermediate web W2. The webs are joined with their respective apertures in proper alignment with one another, as shown in FIGS. 1 and 6. After passage through the pressure rolls 50, the laminated web is fed by additional pairs of pressure rolls 51 and 52 to a cutoff unit 53, which contains a flying shear or rotary knife for cutting the laminated web into cards C. The severed cards C are then delivered to a receptacle 54.

It has been assumed that the webs are maintained in continuous motion from the time they leave the supply reels until the cards C are severed therefrom. The same steps could be performed if the webs were moved intermittently, with the webs being punched and cut during their stationary intervals by members that do not travel with the web.

In manufacturing the card shown in FIG. 9, it will be understood that a single web may be continuously fed through a grinding station where suitable cyclically operable grinding devices disposed on each side of the web would operate to grind the shoulders. From the grinding station the web would be fed through a suitable flying punch unit and then a cutoff unit to provide the individual apertured cards.

Figure 13:
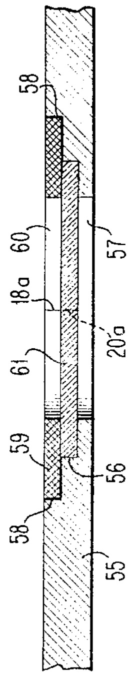
FIG. 13 is a sectional view of a portion of a single ply card adapted to receive and retain a circular film insert.

FIG. 13 illustrates how a single ply card 55 may be adapted to receive a circular film piece in the same manner as the laminated card shown in FIG. 1. As shown, card 55 has a circular hollow portion 56 which is formed in one face of the card by a grinding operation, or the like. A circular aperture 57 having a smaller diameter than the diameter of the hollow portion 56 is cut through the remaining card stock. An additional circular portion of card stock is removed or ground from the face of the card to provide a shoulder 58 around the hollow portion 56. Suitably secured to the shoulder, by means of an adhesive, is a circular paper or transparency piece 59. The circular piece 59 is provided with a circular aperture 60 which is smaller than the diameter of the hollow portion 56.

The apertures 57 and 60 and the hollow portion 56 are superposed in alignment to provide the internal groove or race for retaining an inserted circular film or transparency piece 61. A straight slot 18*a*, similar to the slot 18 shown in FIG. 1, is provided to intersect the aperture 60 and a straight slot 20*a*, similar to the slot 20 shown in FIG. 3, is provided on the film piece 61 to facilitate screwing the film piece into and out of the hollow portion 56.

While the invention has been particularly shown and described with reference to preferred embodiments thereof, it will be understood by those skilled in the art that various changes in form and details may be made therein without departing from the spirit and scope of the invention.

What is claimed is:

1. A record card for mounting film and the like comprising a top ply, a bottom ply, an intermediate ply secured to the inner faces of said top and bottom plies, a circular aperture in said intermediate ply, circular apertures in said top and bottom plies in alignment with said aperture in the intermediate ply, said last named apertures being smaller in diameter than said first named aperture to form an internal circular groove or race between the planes of the opposite faces of the card into which a film may be inserted and retained, a small cut in said top ply which intersects the aperture therein, a circular film mounted in said internal groove or race, and a small cut in said film which intersects the periphery thereof, the cuts in said top ply and said film facilitating the screwing of said film into and out of said internal groove or race.

2. A single ply record card for mounting film and the like having a circular portion removed from one face of the card, a circular aperture communicating between said circular portion and the other face of said card, said circular aperture being smaller in diameter than said circular portion, a second circular portion removed from said one face of the card to provide a shoulder surrounding said first circular portion, a sheet mounted on said shoulder and having a circular aperture superposed in alignment with said first named circular portion and said first named circular aperture, the aperture in said sheet having a smaller diameter than said first named circular portion, a small cut in said sheet which intersects the aperture therein, and a circular film mounted in said first named circular portion, said film including a small cut which intersects the periphery thereof, the cuts in said sheet and film facilitating the screwing of said film into and out of said first named circular portion.

3. A record card for mounting film and the like comprising a top ply, a bottom ply, an intermediate ply secured to the inner faces of said top and bottom plies, a circular aperture in said intermediate ply, circular apertures in said top and bottom plies in alignment with said aperture in the intermediate ply, said last named apertures being smaller in diameter than said first named aperture to form an internal circular groove or race between the planes of the opposite faces of the card into which a film may be inserted and retained, a slit in said top ply which intersects the aperture therein and extends outward to at least the periphery of the circular aperture in said intermediate ply, a circular film mounted in said internal groove or race, and a slit in said film which intersects the periphery thereof and extends inward to at least the periphery of the circular aperture in said top ply, the slits in said top ply and said film facilitating the screwing of said film into and out of said internal groove or race.

References Cited by the Examiner

UNITED STATES PATENTS

| | | | |
|---|---|---|---|
| 2,014,743 | 9/1935 | Metzler et al. | 40—159 |
| 2,127,940 | 8/1938 | Rinn | 40—159 |
| 2,690,022 | 9/1954 | Sacre | 40—159 |
| 2,834,136 | 5/1958 | Kiehl | 40—159 |
| 2,843,955 | 7/1958 | Engelstein | 40—158 |
| 2,861,370 | 11/1958 | McArthur | 40—159 |
| 3,090,146 | 5/1963 | Beispel | 40—158 |

FOREIGN PATENTS

| | | |
|---|---|---|
| 481,567 | 9/1916 | France. |

EUGENE R. CAPOZIO, *Primary Examiner.*

EDWARD V. BENHAM, JEROME SCHNALL, *Examiners.*